United States Patent [19]

Nozawa et al.

[11] Patent Number: 4,960,474
[45] Date of Patent: Oct. 2, 1990

[54] GALLIUM-CONTAINING MAGNET FOR A MOTOR

[75] Inventors: Yasuto Nozawa, Kumagaya; Shigeho Tanigawa, Konosu; Katsunori Iwasaki, Kumagaya, all of Japan

[73] Assignee: Hitachi Metals, Ltd., Tokyo, Japan

[21] Appl. No.: 241,735

[22] Filed: Sep. 8, 1988

[30] Foreign Application Priority Data

Sep. 9, 1987 [JP] Japan ................... 62-225892

[51] Int. Cl.$^5$ ............................ H01F 1/053
[52] U.S. Cl. ................................... 148/302
[58] Field of Search ............... 148/302; 420/83, 440

[56] References Cited

U.S. PATENT DOCUMENTS 4,374,665  2/1983  Koon ................................. 420/440
4,827,235  5/1989  Imomata et al. ................... 148/302

OTHER PUBLICATIONS

Hadjipanayis, G. C., et al., "Cobalt Free Permanent Magnet Materials Based on Iron-Rare-Earth Alloys", *Journal of Applied Physics*, 55(6), Mar. 15, 1984.

Primary Examiner—Theodore Morris
Assistant Examiner—George Wyszomierski
Attorney, Agent, or Firm—Finnegan, Henderson, Farabow, Garrett & Dunner

[57] ABSTRACT

In a magnetically anisotropic magnet for use in a motor, comprising at least one rare earth element (R), Fe and boron (B), said magnet having fine crystal grains, the improvement comprising Ga added in the magnet so that the magnet has a surface magnification of not less than 6, a residual magnetic flux density in the direction of easy magnetization of not less than 11 kG and a coercive force of not less than 12 kOe.

The invention also provide a method of producing the magnetically anisotropic magnet for use in a motor, comprising the steps of: forming flakes by rapid quenching a molten alloy consisting of at least one rare earth element (R), Fe, boron (B) and an optical metal element (M); compacting the flakes to provide a green compact; and warm plastic working the green compact at a temperature between 600° C. and 800° C. at a strain rate of 0.0001 to 0.1 per second with a plastic working ratio (ho/h) of not less than 2.

10 Claims, 4 Drawing Sheets

COMPACTING DIRECTION BEING VERTICAL TO MAGNETIC FIELD (COMPACTING METHOD BY USE OF TRANSVERSE MAGNETIC FIELD)

FIG. 6b

COMPACTING DIRECTION BEING PARALLEL TO MAGNETIC FIELD (COMPACTING METHOD BY USE OF LONGITUDINAL MAGNETIC FIELD)

GALLIUM-CONTAINING MAGNET FOR A MOTOR

BACKGROUND OF THE INVENTION

The present invention relates to a magnet suitable for use in a voice coil motor used in the external memory of an electronic computer or for a motor used in household electrical appliances or factory automation (FA) devices, and, more particularly, to a magnet having a complicated shape which is very difficult to fabricate using known techniques.

As reduction in size, high-speed operation, and increase in the capacity have been demanded in the external memories of electronic computers, in household electrical appliances and in factory automation (FA) devices, there is an increasing demand for a magnet which has more excellent magnetic characteristics as a component of these electrical devices. This is because any space accommodating a motor in these electrical devices is limited, which in turn limits the shape of the motor to a thin and flat one, and hence the shape and characteristics of a magnet are demanded to be thin, flat and highly efficient.

Figure 2:
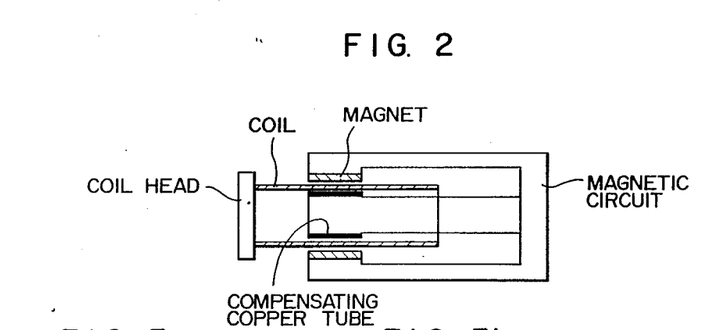
FIGS. 2 and 3a to 3c are cross-sectional views of examples of a voice coil motor.
Figure 3A:
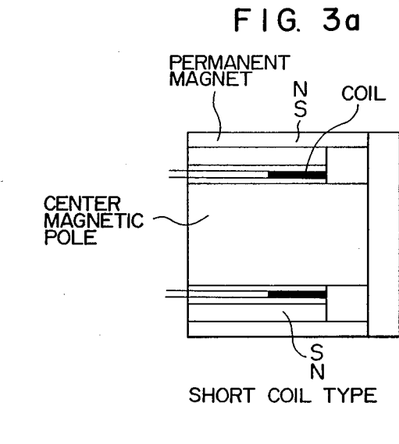
Figure 3B:
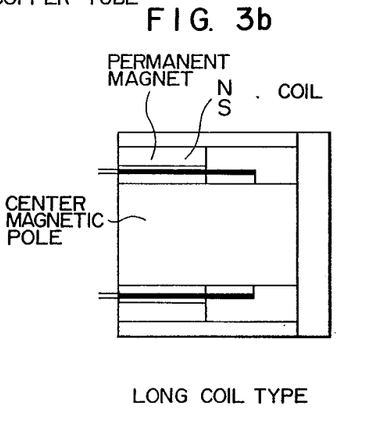
Figure 3C:
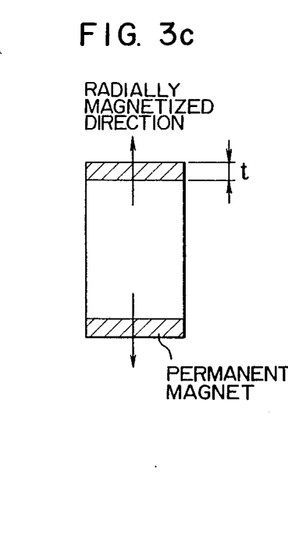

Further, magnets having various shapes that can meet various applications have been demanded. For example, voice coil motors (hereinafter referred to as VCM) used in the external memories of electronic computers are sorted into two kinds by shape: one employs a ring-shaped magnet, and the other uses flat and plate-like magnets, as shown in FIGS. 2 and 3. Since the electromagnetic force is proportional to Bg. le, where Bg is the magnetic flux density of a gap and le is the effective length of a coil, larger and flatter plate-shaped magnets or longer ring-shaped magnets having a larger diameter have been sought after so that better magnetic characteristics and a large le can be provided. Under these circumstances, attempts have been made to employ a rare-earth element (R) - Fe - B type permanent magnet having both larger residual flux density (hereinafter referred to as Br) and larger inherent coercive force (hereinafter referred to as iHc) in the VCM in place of a conventionally employed SmCo magnet. The Japanese Patent Laid-Open No. 61-266056 discloses a magnet for use in the VCM which has a magnetic flux density Bg in a magnetic circuit increased in order to improve an electromagnetic force ($k_F$), to increase the control gain (related to $1/k_F$) for a transfer function, and to decrease the positioning errors. Japanese Patent Laid-Open No. 61-210862 discloses a magnet for use in the VCM which has a magnetic flux density of not less than 9000 G at a operating point and an excellent rectangularity ratio in the demagnetizing curve.

Figure 4A:
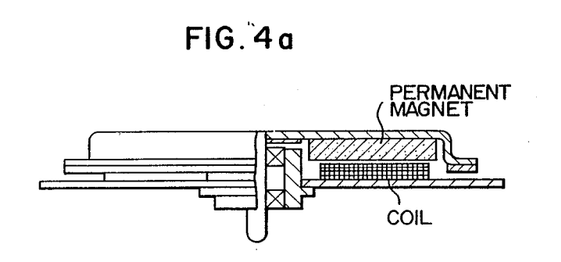
FIGS. 4a and 4b are cross-sectional views of an example of a disk-rotor type brushless motor.
Figure 4B:
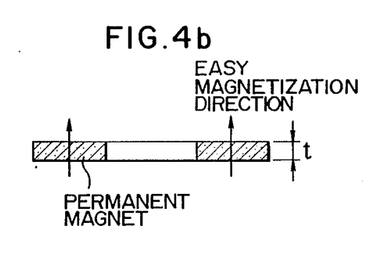

Disk rotor type brushless motors employed in household electrical appliances such as VTR and cassette decks incorporate a disk-shaped rotor made of a permanent magnet such as that shown in FIG. 4. In this kind of motor, a decreased moment of inertia reduces the ability to cope with disturbances and increases in wow and flutter (unevenness in rotation). Therefore, flat and large disk-shaped magnets have been sought in order to improve the "flywheel effect" ($GD^2$), where D is the diameter of the rotor and G is the gravitational constant.

The present inventor proposes a concept of "surface magnification" to standardize the shape of magnet for use in a motor. More specifically, the surface magnification is defined by (the volume of a magnet)/(the thickness in the direction of easy magnetization)[3], and it can be said that permanent magnets having a large surface magnification have been demanded when improving performance of office automation (OA) devices.

Conventionally, permanent magnets are manufactured by the transverse magnetic field compacting method, in which the direction of application of a magnetic field is perpendicular to the direction of compacting. They are also manufactured by the longitudinal magnetic field compacting method in which the direction of application of the magnetic field is parallel to the direction of compacting. It is known from experience that rare earth type magnets made of the same materials have different magnetic characteristics when the different methods are adapted to manufacture the magnets, and that the former method produces a permanent magnet having a higher Br.

Figure 5A:
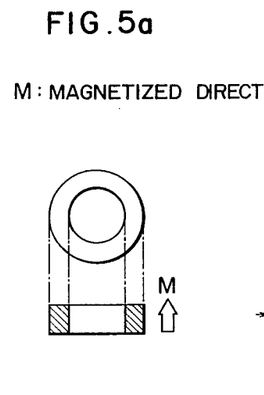
FIGS. 5a to 5c illustrate various shapes of a magnet for a motor.
Figure 5B:
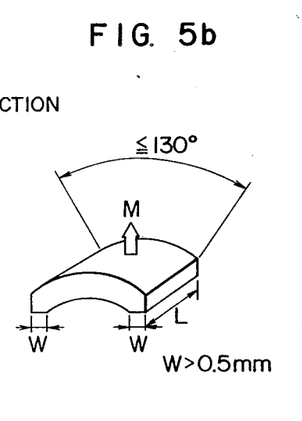
Figure 5C:
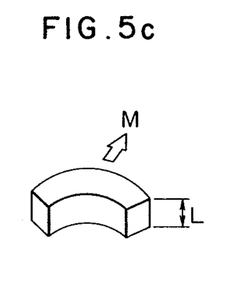
Figure 6A:
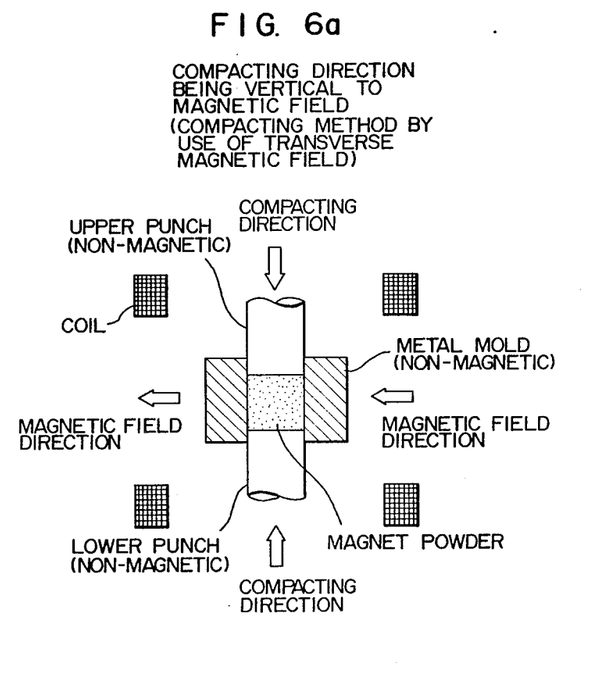
FIGS. 6a and 6b schematically show the working methods.
Figure 6B:
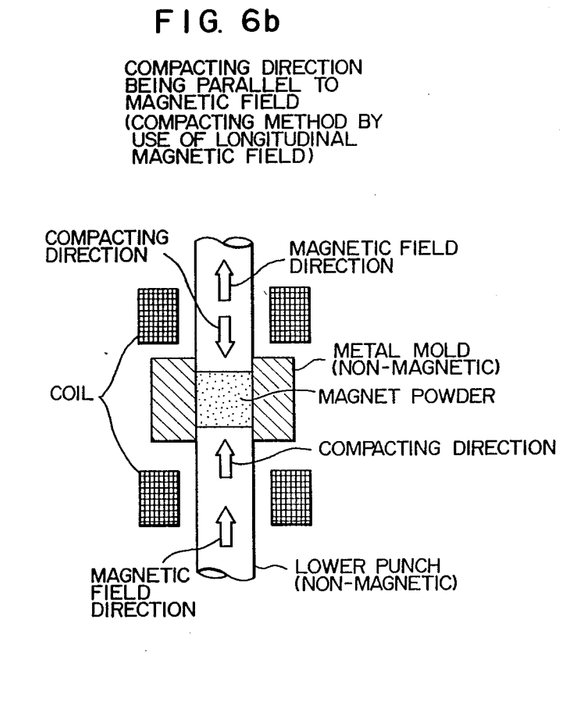

However, it is very difficult to adapt the transverse magnetic field compacting method to the manufacture of permanent magnets having shapes such as those shown in FIGS. 5(a) to 5(c). The magnet shown in FIG. 5(a) has a ring-like shape in which the direction of easy magnetization (M) coincides with the direction of thickness. The magnet shown in FIG. 5(b) has a C-shape in which L is long compared with the width W. FIG. 5(c) shows a magnet having a fan-like shape in which L is long.

Therefore, magnets for use in VCM and magnets for use in disk-rotor type brushless motors must be manufactured by the longitudinal magnetic field compacting method. However, since the direction of application of the magnetic field coincides with the direction of compression in this method, the orientation of grains are disturbed in the direction of thickness, decreasing Br during the compacting. Therefore, it has been impossible to manufacture anisotropic sintered magnets appropriate for the use which have the above described shapes.

In the transverse magnetic field compacting method, in which the direction of compression in the sintered magnets is perpendicular to the direction of application of the magnetic field, it is very difficult to provide uniform orientation of grains throughout a sintered magnet having a surface magnification of 6 or above (manufactured by powder metallurgy) due to nonuniform compression pressure distribution. Further, there is such shortcoming that a large-scale magnetic field application means must be used to obtain the magnet. Therefore, it has been impossible to manufacture a sintered permanent magnet having a surface magnification of 6 or more.

In order to lower the temperature coefficient $\alpha(\%/°C.)$ of Br in the sintered magnet, the amount of Co added is increased. However, this addition rapidly decreases iHc.

Accordingly, warm working magnets have been proposed in order to eliminate the above-described problems of the sintering (see European Patent Laid-Open Publication No. 0133758). In warm working, magnetically anisotropic magnets are manufactured by plastically warm deforming the alloy powder produced by the rapid quenching method. In this working, since the direction of compression becomes substantially identical with the direction of easy magnetization during plastic deformation, disturbance of orientation of grains only occurs at a very low level, unlike the sintered magnets, and this makes warm working suitable to the manufacture of plate-like magnets.

However, in this manufacturing method utilizing plastic deformation, heating at a temperature of 700° C. or above is limited to 5 minutes or less in order to prevent reduction in the coercive force (iHc) which reduction is caused by the growth of crystal grains. Therefore, it is difficult to manufacture a magnet for a motor which magnet is formed by uniformly heating a large compact body and which magnet has a surface magnification of 6 or above.

Further, there is such problem that, even if a magnet is manufactured by heating a compact body for less than 5 minutes, it has a coercive force of 12 KOe at most and is inferior in heat-resistivity.

SUMMARY OF THE INVENTION

Accordingly, an object of the present invention is to provide a flat Nd - Fe - B type magnet produced by warm working which has a Br in the direction of thickness higher than that of sintered magnets and a surface magnification of 6 or more.

To this end, the present invention provides, in one of its aspect, a magnetically anisotropic magnet for use in a motor, comprising at least one rare earth element (R), Fe and boron (B), said magnet having fine crystal grains, said magnet further comprising Ga so that the magnet has a surface magnification of not less than 6, a residual magnetic flux density in the direction of easy magnetization of not less than 11 kG and a coercive force of not less than 12 kOe.

More specifically, in the present invention, Ga is added to the composition of the magnet for the motor so that the resultant magnet has a residual magnetic flux density in the direction of easy magnification of not less than 11 kG and a coercive force of not less than 12 kOe. The composition of the magnet is represented by $RaFeCo_bB_cGa_dM_e$ in terms of atomic percent in which the R is at least one element selected from a group consisting of Nd, Pr, Dy, Tb and Ce which satisfies $(Nd+Pr)/R \geq 0.7$; M being at least one element selected from a group consisting of Zn, Al, Si, Nb, Ta, Ti, Zr, Hf and W; $12 \leq a \leq 18$, $0 \leq b \leq 30$, $4 \leq c \leq 10$, $0 \leq d \leq 3$, and $0 \leq e \leq 2$. The average crystal grain size thereof is between 0.01 and 0.5 μm.

In the present invention, the magnet is made to have anisotropy by the plastic deformation process so that the magnet has improved Br in the direction of thickness, and reduction in iHc apt to occur by heating and plastic deformation processes is suppressed by the addition of Ga, thereby enabling provision of a large magnet having excellent magnetic characteristics and a surface magnification of not less than 6.

In the present invention, Br is set to 11 kG or more, because this characteristic has been sought after in recent years and because it is difficult to provide it by the sintering which is effected by use of a press under a longitudinal magnetic field.

Although the magnet for the VCM is often used in an air-conditioned computer room, a heat resistance of 80° C. or more is in general required because of rise in temperature in the interior of the devices. Therefore, a value of the iHc of 12 kOe or more is preferable.

Magnets for use in disk rotor type brushless motors are used under more severe conditions than those of the voice coil motors, and a heat-resistance of 100° C. or above is in general required. In consequence, iHc is preferably set to 15 kOe or more.

The composition of the R - Fe - B type magnet according to the present invention is substantially the same as that of the conventional magnet except for Ga. The R - Fe - B type magnet essentially has $R_2Fe_{14}B$ phase or $R_2(Fe, Co)_{14}B$ phase. The composition of the magnet is determined in the above described range for the following reasons: if R is set to less than 12 at %, α-Fe appears, preventing provision of a sufficient proper iHc. If R exceeds 18 at %, Br is reduced. If Nd or Pr which has a high saturation magnetization value is selected as R, $(Pr+Nd)/R \geq 0.7$ should be satisfied in order to attain the Br of 11 kG or more.

Ce is contained in an inexpensive material such as didymium etc. The magnetic characteristics of a resultant magnet are not adversely affected if the amount of Ce added is small ($Ce/R \leq 0.1$). Dy and Tb are effective to improve iHc. However, the amount thereof should be limited to a value which satisfies $(Tb+Dy)/R \leq 0.3$ in order to obtain the Br of 11 kG or more.

If Co is added to replace Fe, the Curie point of the magnetic phase is improved. Addition of Co together with Ga improves both the temperature coefficient of Br and irreversible demagnetization ratio at a high temperature.

If the amount of B added is less than 4 at %, the $R_2Fe_{14}B$ phase is not sufficiently formed, and Br and iHc are not increased.

If more than 11 atomic % of B is added, Br is reduced due to appearance of phases undesirable to magnetic characteristics. Therefore, the amount of B is determined between 4 at % and 11 at %.

Ga is effective to improve iHc. However, if the amount of Ga is less than 0.001 at %, no improvement of iHc is recognized. In order to obtain iHc of 15 kOe or more, the amount of Ga should be 0.01 at % or more. However, when the amount of Ga exceeds 2 at %, Br starts to decrease. iHc decreases down to a value lower than that of a magnet which contains no Ga, if the amount of Ga exceeds 3 at %. In consequence, it is preferable for the amount of Ga to be set between 0.001 at % and 3 at %. More preferably, it is set between 0.01 at % and 2 at %.

M is effective to improve iHc and suppress the growth of crystal grains. In M, Zn, Al and Si are capable of improving iHc. If the amount of these elements added is 2 at % or less, degree of decrease in Br is small. Nb, Ta, Ti, Zr, Hf and W are effective to suppress the growth of crystal grains. The amount of these elements should be 2 at % or less so as to prevent deterioration of workability.

The individual grains of the magnet according to the present invention have a substantially disk-like shape which is prepared by deforming flatly a shape of tetragonal grain shape system. Therefore, the average grain size of the magnet according to the present invention is expressed by the diameter of a sphere calculated by a method comprising the steps of : measuring the sizes of thirty or more crystals in the direction of the C axis which is identical with the direction of the easy magnetization by use of the intercept method (defined in JIS G-0551) to thereby calculate an average size of the crystals in the direction of the C axis ; measuring the thicknesses of those crystals to thereby calculate an average thickness of the crystals ; and calculating a diameter of the sphere having the same volume as those crystals' average volume calculated from both the average size and thickness. The average grain diameter is set to 0.5 μm or less, since a diameter of more than 0.5 μm decreases the iHc.

The present invention provides, in another of its aspects, a method of manufacturing a magnet for a motor, which comprising the steps of: forming flakes by rapid quenching a molten alloy consisting of at least one rare earth element (R), Fe, boron (B) and an optional metal element (M); compacting the flakes to provide a green compact; and warm plastic working the green compact at a temperature between 600° C. and 800° C. at a strain rate of 0.0001 to 0.1 per second with a plastic working ratio (ho/h) of not less than 2 so that a resultant magnet is magnetically anisotropic and has a surface magnification of not less than 6, a residual magnetic flux density in the direction of easy magnetization of not less than 11 kG, and a coercive force of not less than 12 kOe.

As has been stated previously, it is difficult to obtain a magnet having a surface magnification of 6 or more by the transverse magnetic field press. In particular, it is very difficult to provide a magnet having a cylindrical, tubular, trapezoidal or arcuate shape. However, in the present invention, a magnet having a rectangular shape or any of the above described shapes can be readily worked since it is made magnetically anisotropic by the plastic deformation process.

Generally, a plastic working ratio is expressed by ho/h, where ho is the height of a sample which is not plastically worked and h is the height of a plastically worked sample. In the present invention, the plastic working ratio is set to 2 or more so as to obtain the Br of 11 kG or more.

In the present invention, compacting is conducted so as to increase the density of a magnet. Usual hot press or hot hydrostatic extrusion may be employed.

Upsetting, extrusion, forging or spinning may be employed to perform plastic deformation in the present invention. However, warm upsetting is most preferable, since it is capable of applying magnetic anisotropy to a magnet most effectively. If dies shaped into a final form are employed, near net shape working is possible.

The deformation temperature is set between 600° C. and 800° C., because a temperature less than 600° C. greatly increases deformation resistance and produces a magnet having a low Br. With the temperature of more than 800° C., iHc becomes less than 12 kOe due to the growth of crystal grains.

The strain rate is set to 0.0001 per sec. or more because, if the working time is long, iHc is reduced, which is undesirable from the viewpoint of production efficiency. Also, the strain rate is set to 0.01 per sec. or less because, if it is higher than this maximum value, it is impossible to sufficiently make a magnet anisotropic and because cracks are apt to be formed.

DETAILED DESCRIPTION OF THE PREFERRED EMBODIMENTS

The present invention will be hereinunder described in detail by way of example.

EXAMPLE 1

Figure 1A:
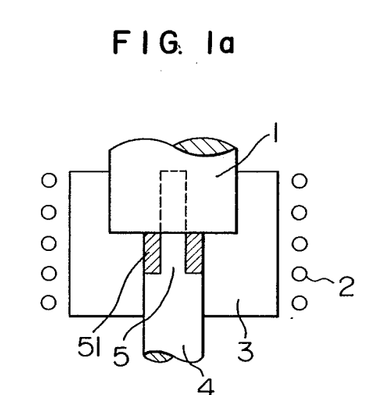
FIGS. 1a to 1d schematically illustrate a manufacturing process of a magnet for a motor according to the present invention.

An alloy having the composition of $Nd_{14}$-$Fe_{79.25}$$B_6$$Ga_{0.75}$ in terms of atomic % was prepared by the arc melting, and the prepared alloy was then formed into flakes in an Ar atmosphere by the single roll method. The peripheral speed of the roll was 30 m/sec, and the obtained flakes had various shapes having a thickness of 25±3 μm. It was found by the X-ray analysis that the thus-obtained flakes were a mixture of amorphous and crystal. Subsequently, these flakes were roughly ground to 32 mesh or less, and ground flakes were shaped into a compact having a diameter of 60 mm and a height of 21 mm by use of dies under the pressure of 3.0 ton/cm². Next, the compact was set in working space defined by an upper punch 1, a lower punch 4 and dies 3 made of a heat-resistant alloy, as shown in FIG. 1(a). A high-frequency coil 2 was provided around the dies 3. The upper punch 1 employed in this example was of the flat type, while the lower punch 4 had a protrusion 5 at its upper portion.

Figure 1B:
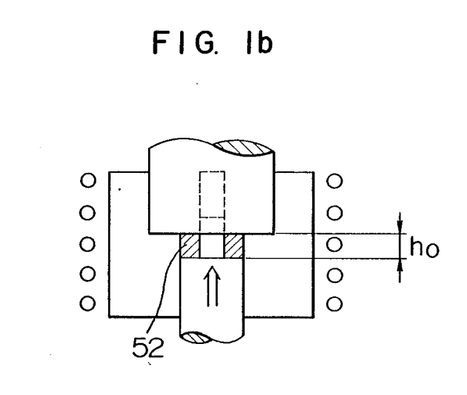

Subsequently, the body set in the working space was compacted until it had a height (ho) of 16 mm while the surface of the dies was being heated up to about 620° C. by the high-frequency coil, as shown in FIG. 1(b). The density of 5.8 g/cc of the green compact prior to compacting was increased to 7.5 g/cc after the compacting. At this time, the body did not yet show magnetic anisotropy.

Figure 1C:
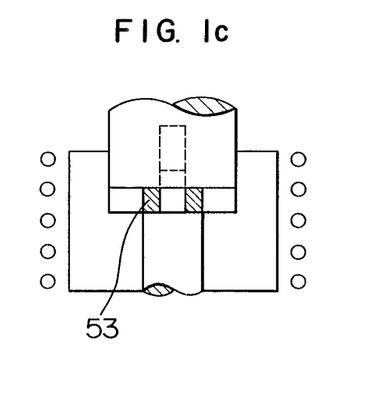
Figure 1D:
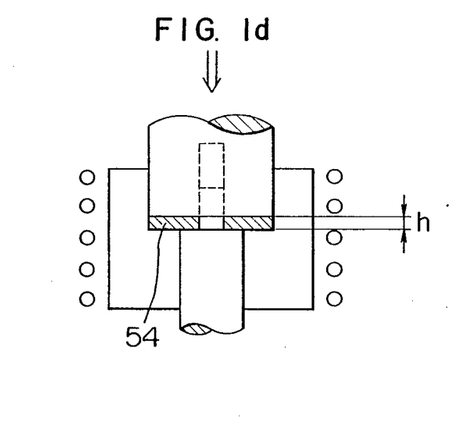

Thereafter, warm upsetting was performed by lowering the upper punch 1 while fixing the lower punch 4 with the surface of the dies being kept at a temperature of about 750° C. FIG. 1(c) shows the state of a sample which is being warm upset, and FIG. 1(d) shows a sample which has been warm upset. The height (h) of the sample which had been warm upset was 7 mm. Therefore, the plastic working ratio ho/h was 2.3.

In this example, the rate at which the temperature was raised was 80° C./min, the compacting time was 0.4 minute, and the strain rate of the plastic working was 0.025 sec$^{-1}$. The obtained magnet had a size of 60 mm in diameter and 7 mm in height. The volume thereof was 10996 mm³, and the thickness thereof in the direction of easy magnetization was 7 mm. Therefore, the surface magnification obtained by dividing the volume of the magnet by the cube of the thickness was 32. The end surfaces of the obtained magnet had substantially no cracks. The average grain diameter was 0.4 μm, the Br in the direction of thickness was 12.2 kG, and iHc was 19.7 kOe. Although a material having the same composition as that of the example explained above did not become a magnet when it was sintered, a sintered magnet having a composition, $Nd_{13}Dy_2Fe_{77}B_6$, was prepared for comparison by use of the longitudinal magnetic field press method. The transverse magnetic field press method in which the direction of compression was perpendicular to the direction of application of the magnetic field was also tried. However, the orientation of grains was extremely non-uniform, and it was impossible to obtain a sintered magnet. The Br was 11.6 kG, and the iHc was 17.2 kOe. When voice coil motors were assembled by using these magnets, the gap magnetic flux density of the voice coil motor employing the magnet according to the present invention was 6900 G, while that of the voice coil motor employing the comparison example was 6000 G, which means that an improvement of about 15% was achieved in the invention.

This means that the electromagnetic force improved about 15%, that the control gain was higher, and that an accurate positioning was possible in the resultant voice coil motor.

EXAMPLE 2

Magnets containing Ga in various amounts ranging between 0 at % and 5 at % were manufactured in the same manner as in the case of Example 1. Table 1 shows the magnetic characteristics of those magnets and the gap magnetic flux densities Bg of the voice coil motors employing these magnets.

TABLE 1

| Amount of Ga (at %) | Br (kG) | iHc (kOe) | Bg (G) |
|---|---|---|---|
| 0 | 13.1 | 11.7 | 6000 |
| 0.001 | 12.6 | 12.8 | 6280 |
| 0.01 | 12.4 | 16.2 | 6850 |
| 0.1 | 12.0 | 19.9 | 6920 |
| 1 | 11.8 | 20.4 | 6950 |
| 2 | 11.6 | 20.6 | 6970 |
| 3 | 11.1 | 20.9 | 6980 |
| 5 | 9.8 | 11.4 | 6990 |

It can be seen from Table 1 that it is preferable for the amount of Ga to be set to 3 atomic % or less.

EXAMPLE 3

Permanent magnets having the composition of $Nd_{14}Fe_{bal}B_6Ga_{0.2}M_e$ (where M is one element selected from the group of Zn, Al, Si, Nb, Ta, Ti, Zr, Hf and W, and e is equal to 2 or 3) in terms of atomic % were manufactured in the same manner as in the case of Example 1. Table 2 shows the characteristics of these magnets. It is obvious that addition of up to 2 atomic % of Zn, Al or Si improves the iHc and increases the Br to 11 kG or more.

Addition of up to 2 atomic % of Nb, Ta, Ti, Zr, Hf or W is also effective to improve iHc, and does not deteriorate workability.

TABLE 2

| Added Element M | (at %) | Br (kG) | iHc (kOe) | Cracks |
|---|---|---|---|---|
| Zn | 2 | 12.3 | 17.6 | No crack |
| Zn | 3 | 9.8 | 16.9 | Cracked |
| Al | 2 | 12.0 | 18.4 | No crack |
| Al | 3 | 9.7 | 17.8 | Cracked |
| Si | 2 | 12.1 | 17.4 | No crack |
| Si | 3 | 9.6 | 16.8 | Cracked |
| Nb | 2 | 11.9 | 17.3 | No crack |
| Nb | 3 | 9.8 | 16.7 | Cracked |
| Ta | 2 | 11.6 | 17.4 | No crack |
| Ta | 3 | 9.7 | 16.7 | Cracked |
| Ti | 2 | 11.4 | 17.6 | No crack |
| Ti | 3 | 9.6 | 16.9 | Cracked |
| Hf | 2 | 11.6 | 17.5 | No crack |
| Hf | 3 | 9.8 | 16.8 | Cracked |
| W | 2 | 11.8 | 17.3 | No crack |
| W | 3 | 9.7 | 16.7 | Cracked |

EXAMPLE 4

Magnets were manufactured under the same conditions as those of Example 1 with the exception that various amount of Co were added. Table 3 shows the magnetic characteristics of the thus-obtained magnets.

$\alpha$ denotes the mean temperature coefficient of Br obtained when the temperature varied between 25° and 140° C.

It can be seen from the table that the sintered magnet has a disadvantage in that a large amount of Co, which was added so as to minimize the temperature coefficient $\alpha$, decreased iHc.

TABLE 3

| Composition | Br (kG) | iHc (kOe) | $\alpha$ (%/°C.) |
|---|---|---|---|
| The present invention | | | |
| $Nd_{14}Fe_{bal}B_6Ga_{0.75}$ | 12.0 | 19.8 | −0.13 |
| $Nd_{14}Fe_{bal}Co_{2.5}B_6Ga_{0.75}$ | 12.2 | 19.6 | −0.11 |
| $Nd_{14}Fe_{bal}Co_5B_6Ga_{0.75}$ | 12.0 | 20.2 | −0.09 |
| $Nd_{14}Fe_{bal}Co_{10}B_6Ga_{0.75}$ | 12.0 | 19.4 | −0.08 |
| $Nd_{14}Fe_{bal}Co_{20}B_6Ga_{0.75}$ | 11.7 | 22.0 | −0.06 |
| $Nd_{15}Fe_{bal}Co_{30}B_6Ga_{0.75}$ | 11.0 | 20.2 | −0.04 |
| Comparative example | | | |
| $Nd_{15}Fe_{bal}Co_{40}B_6Ga_{1.5}$ | 10.3 | 10.3 | −0.08 |

EXAMPLE 5

Magnets were manufactured under the same conditions as those in Example 1 except for strain rate. Table 4 shows the magnetic characteristics obtained at various strain rates. As can be seen from the table, it is preferable for the strain rate to be set between 0.0001 and 0.1 per second.

TABLE 4

| Strain rate (sec$^{-1}$) | iHc (kOe) | Br (kG) |
|---|---|---|
| 0.0001 | 18.7 | 12.1 |
| 0.001 | 19.6 | 12.1 |
| 0.01 | 20.4 | 11.9 |
| 0.1 | 20.3 | 11.2 |
| 0.5 | 20.5 | 10.6 |

EXAMPLE 6

Magnets were manufactured under the same conditions as those in Example 1 except for plastic working ratio ho/h. Table 5 shows the magnetic characteristics obtained at various plastic working ratios. It is clear from the table that it is preferable for the ho/h to be equal to or larger than 2.

TABLE 5

| ho/h | iHc (kOe) | Br (kG) |
|---|---|---|
| 1.0 | 21.1 | 8.1 |
| 1.5 | 20.9 | 10.0 |
| 2.0 | 20.1 | 11.1 |
| 2.5 | 19.6 | 11.6 |

EXAMPLE 7

Magnets were manufactured under the same conditions as those in Example 1 except for deformation temperature. Table 6 shows the magnetic characteristics obtained when deformation temperature was varied. From the Table 6, it is clear that the deformation temperature is preferably selected in a range of 600° to 800° C.

TABLE 6

| Temperature (°C.) | iHc (kOe) | Br (kG) | Cracks |
|---|---|---|---|
| 550 | 23.3 | 9.7 | Much |
| 600 | 22.3 | 11.0 | Few |
| 700 | 20.1 | 12.1 | No crack |
| 800 | 16.2 | 12.3 | No crack |

TABLE 6-continued

| Temperature (°C.) | iHc (kOe) | Br (kG) | Cracks |
|---|---|---|---|
| 850 | 10.8 | 10.7 | No crack |

EXAMPLE 8

Permanent magnets having various surface magnifications were manufactured in the same manner as in the case of Example 1 by use of compacts having various heights. Tables 7 and 8 show the magnetic characteristics of the magnets manufactured in this Example and the sintered magnets, respectively. It was impossible to obtain sintered magnets having a surface magnification of 6 or more.

TABLE 7

| (Magnets according to this invention) | | | |
|---|---|---|---|
| Surface magnification | Br (kG) | iHc (kOe) | Cracks |
| 4 | 9.4 | 17.2 | Cracked |
| 5 | 9.8 | 17.2 | Cracked |
| 6 | 12.6 | 17.8 | No crack |
| 8 | 12.8 | 17.8 | No crack |
| 10 | 13.2 | 17.9 | No crack |
| 15 | 13.3 | 18.0 | No crack |
| 20 | 13.2 | 18.0 | No crack |

TABLE 8

| (Comparison examples: sintered magnets) | | | |
|---|---|---|---|
| Surface magnification | Br (kG) | iHc (kOe) | Cracks |
| 4 | 9.3 | 17.0 | Cracked |
| 5 | 9.6 | 17.1 | Cracked |

EXAMPLE 9

Magnets were manufactured under the same conditions as those of Example 1 except for thickness. At the same time, disk-like shaped magnets which were comparison examples (sintered magnets having the same components) were manufactured. Both the magnets had dimensions of an outer diameter of 60 mm, an inner diameter of 8 mm and a thickness of 3 mm (the direction of easy magnetization being the direction of the thickness) corresponding to a surface magnification. The thus-obtained magnets were assembled to provide disk rotor type brushless motors by using a shaft and thirty two magnetic poles. When the output characteristics of the motors were examined, the output characteristic of the motor employing the magnets according to the present invention were 21% higher than that of the comparison example. No irregular rotation nor wow flatter occurred, and good torque ripple rate were obtained.

When the output characteristics of the motors were again examined after these motors were kept at a temperature of 120° C. for 4000 hours, no change in characteristics with lapse of time were seen in the case of the motor employing the magnets according to the present invention, while in the case of the comparison examples they decreased down to 83% of the initial values.

As will be understood from the foregoing description, the magnet for the motor according to the present invention can be formed into a complicated shape and can have a residual magnetic flux density of 11 kG or more and a coercive force of 12 kOe or more. In consequence, the performance of a resultant motor can be improved, and the size thereof can be decreased.

What is claimed is:

1. A magnetically anisotropic magnet for use in a motor, formed from a material comprising at least one rare earth element (R), Fe and boron (B), and further comprising Ga added in an amount at least 0.001 at %, said magnet having fine crystal grains, said magnet also having a surface magnification of not less than 6, a residual magnetic flux density in the direction of easy magnetization of not less than 11 kG and a coercive force of not less than 12 kOe.

2. The magnet for use in motor according to claim 1, wherein the residual magnetic flux density in the direction of easy magnetization is not less than 11 kG, the coercive force is not less than 12 kOe, the composition of said magnet being $R_a Fe_{bal} Co_b B_c Ga_d M_e$ in terms of atomic percent in which composition the R is at least one element selected from a group consisting of Nd, Pr, Dy, Tb and Ce and in which R satisfies $(Nd+Pr)/R > 0.7$, M being at least one element selected from a group consisting of Zn, Al, Si, Nb, Ta, Ti, Zr, Hf and W, $12 < a < 18$, $0 < b < 30$, $4 < c < 10$, $0.001 < d < 3$, and $0 < e < 2$, and the average crystal grain size being not more than 0.5.

3. The magnet for use in a motor according to claim 1 wherein said magnet is ring-shaped.

4. The magnet for use in a motor according to claim 1 wherein said magnet is disk-shaped.

5. The magnet for use in a motor according to claim 1 wherein said surface magnification is not less than 8.

6. The magnet for use in a motor according to claim 1 wherein said surface magnification is not less than 9.

7. The magnet for use in a motor according to claim 1 wherein said surface magnification is not less than 10.

8. The magnet for use in a motor according to claim 1 wherein said surface magnification is not less than 15.

9. The magnet for use in a motor according to claim 1 wherein said surface magnification is not less than 20.

10. The magnet for use in a motor according to claim 1 wherein said surface magnification is not less than 30.

* * * * *

UNITED STATES PATENT AND TRADEMARK OFFICE
CERTIFICATE OF CORRECTION

PATENT NO. : 4,960,474

DATED : October 2, 1990

INVENTOR(S) : Yasuto Nozawa, Shigeho TANIGAWA, Katsunori IWASKI

It is certified that error appears in the above-identified patent and that said Letters Patent is hereby corrected as shown below:

Claim 2, column 10, line 37, after "0.5", insert --$\mu$m--.

Signed and Sealed this

Seventh Day of April, 1992

*Attest:*

HARRY F. MANBECK, JR.

*Attesting Officer*  *Commissioner of Patents and Trademarks*